United States Patent
Ren et al.

(10) Patent No.: US 12,555,371 B2
(45) Date of Patent: Feb. 17, 2026

(54) VISION TRANSFORMER FOR MOBILENET SIZE AND SPEED

(71) Applicants: Jian Ren, Hermosa Beach, CA (US); Yanyu Li, Malden, MA (US); Ju Hu, Los Angeles, CA (US); Yang Wen, San Jose, CA (US); Georgios Evangelidis, Vienna (AT); Sergey Tulyakov, Santa Monica, CA (US); Kamyar Salahi, La Canada, CA (US)

(72) Inventors: Jian Ren, Hermosa Beach, CA (US); Yanyu Li, Malden, MA (US); Ju Hu, Los Angeles, CA (US); Yang Wen, San Jose, CA (US); Georgios Evangelidis, Vienna (AT); Sergey Tulyakov, Santa Monica, CA (US); Kamyar Salahi, La Canada, CA (US)

(73) Assignee: Snap Inc., Santa Monica, CA (US)

(*) Notice: Subject to any disclaimer, the term of this patent is extended or adjusted under 35 U.S.C. 154(b) by 508 days.

(21) Appl. No.: 18/080,993

(22) Filed: Dec. 14, 2022

(65) Prior Publication Data

US 2024/0203114 A1 Jun. 20, 2024

(51) Int. Cl.
*G06V 10/94* (2022.01)
*G06V 10/77* (2022.01)

(52) U.S. Cl.
CPC .......... *G06V 10/95* (2022.01); *G06V 10/7715* (2022.01)

(58) Field of Classification Search
CPC .... G06V 10/95; G06V 10/7715; G06V 10/82; G06N 3/0455; G06N 3/0464; G06N 3/0499; G06N 3/084
See application file for complete search history.

(56) References Cited

PUBLICATIONS

Graham, Benjamin, et al. "Levit: a vision transformer in convnet's clothing for faster inference." Proceedings of the IEEE/CVF international conference on computer vision. 2021. (Year: 2021).*
Chen, Minghao, et al. "Autoformer: Searching transformers for visual recognition." Proceedings of the IEEE/CVF international conference on computer vision. 2021. (Year: 2021).*
Yan, Haotian, et al. "ConTNet: Why not use convolution and transformer at the same time?." arXiv preprint arXiv:2104.13497 (2021). (Year: 2021).*

(Continued)

*Primary Examiner* — Amandeep Saini
*Assistant Examiner* — Denise G Alfonso
(74) *Attorney, Agent, or Firm* — CM Law; Stephen J. Weed

(57) ABSTRACT

A mobile vision transformer network for use on mobile devices, such as smart eyewear devices and other augmented reality (AR) and virtual reality (VR) devices. The mobile vision transformer network considers factors including number of parameters, latency, and model performance, as they reflect disk storage, mobile frames per second (FPS), and application quality, respectively. The mobile vision transformer network processes images, e.g., for image classification, segmentation, and detection. The mobile vision transformer network has a fine-grained architecture including a search algorithm performing latency-driven slimming that jointly improves model size and speed.

14 Claims, 9 Drawing Sheets

(56) References Cited

PUBLICATIONS

Zhou, Daquan, et al. "Deepvit: Towards deeper vision transformer." arXiv preprint arXiv:2103.11886 (2021). (Year: 2021).*

Pan, Junting, et al. "Edgevits: Competing light-weight cnns on mobile devices with vision transformers." European conference on computer vision. Cham: Springer Nature Switzerland, 2022. (Year: 2022).*

International Search Report and Written Opinion for International Application No. PCT/US2023/083504, dated Apr. 29, 2024 (Apr. 29, 2024)—11 pages.

Junting Pan et al: "EdgeViTs: Competing Light-weight CNNs on Mobile Devices with Vision Transformers", arxiv.org, Cornell University Library, 201 Olin Library Cornell University Ithaca, NY 14853, Jul. 21, 2022 (Jul. 21, 2022).

Yanyu Li et al: "EfficientFormer: Vision Transformers at MobileNet Speed", arxiv.org, Cornell University Library, 201 Olin Library Cornell University Ithaca, NY 14853, Jul. 5, 2022 (Jul. 5, 2022).

* cited by examiner

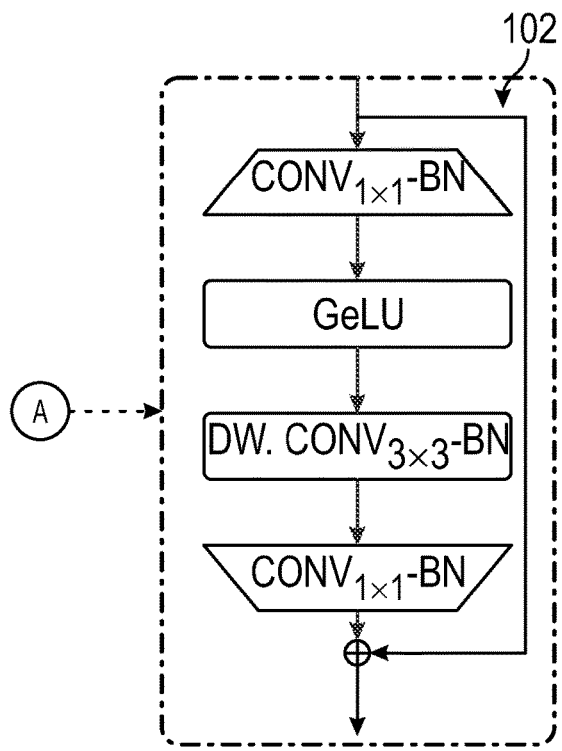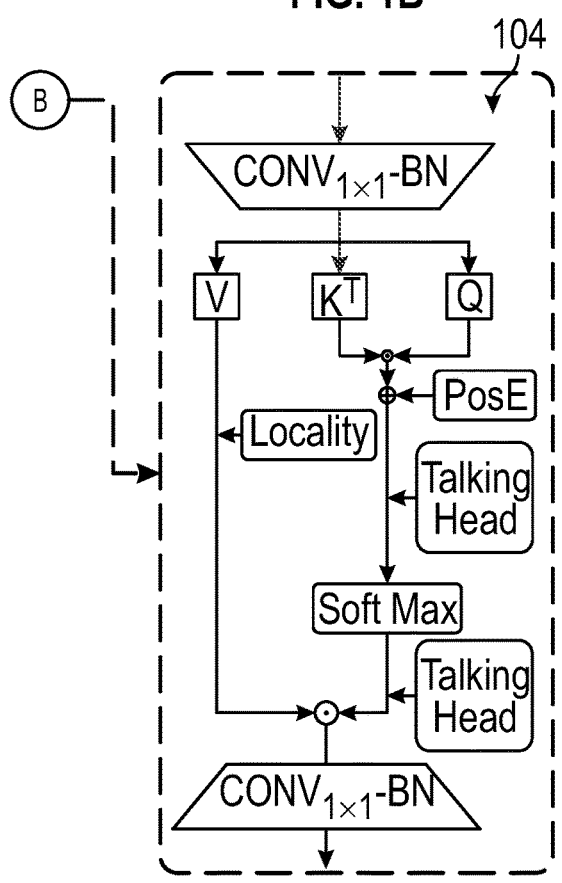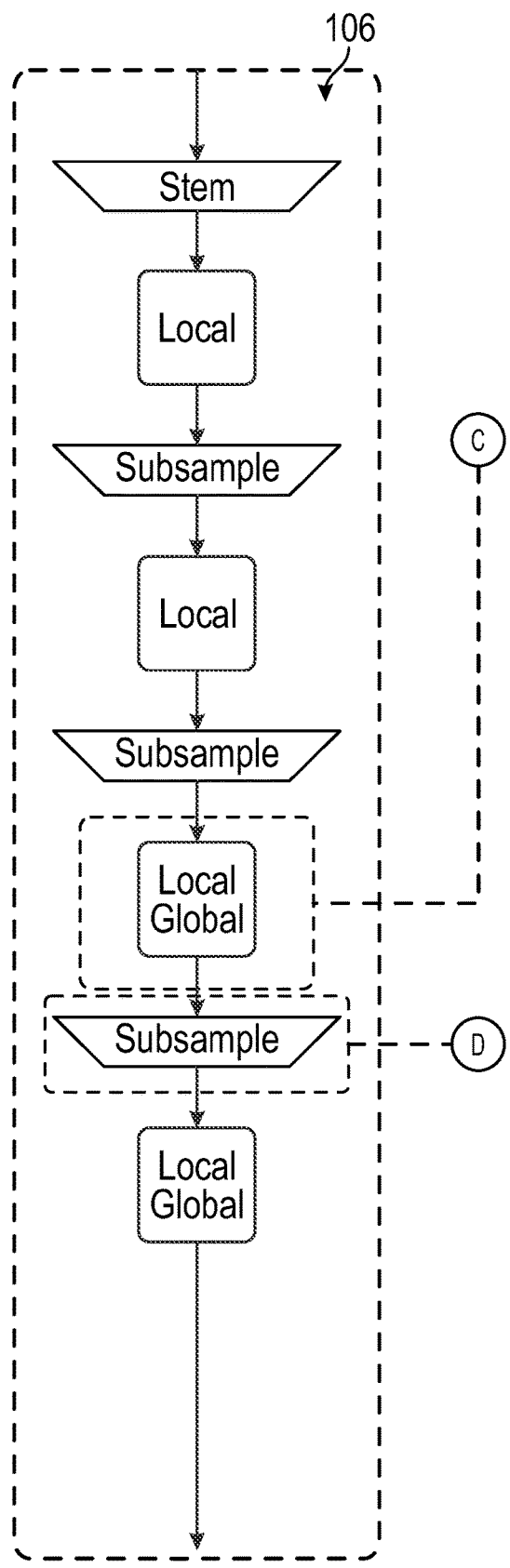
FIG. 1B
FIG. 1C
FIG. 1D

Algorithm 1 Evaluation-based search for size and speed

Require: Latency lookup table $T : \{FFN^{C,E}, MHSA^C\}$
Ensure: Subnet satisfying objectives: params, latency, or MES
  →Super-net pretraining:
  for epoch do
    for each iter do
      for Subnet $\in$ {min, rand-1, rand-2, max} do
        $Y \leftarrow \prod_i \{FFN_i, MHSA_i\}(X_i)$
        $L \leftarrow$ criterion(Y, label), backpropagation
      end for                                         ▷ Sandwich Rule
      Update parameters (AdamW [51])
    end for
  end for                                             ▷ Finish Supernet Training
  → Joint search for size and speed:
  Initialize State $S \leftarrow \{S_{N_{max}}, S_{C_{max}}, S_{E_{max}}\}$

While Objective not satisfied do
    Execute action $\hat{A} \leftarrow \arg\min_A \frac{\Delta Acc}{\Delta MES}$
    Update state frontier
  end while                                           ▷ get sub-net with target MES
  → Train the searched architecture from scratch

FIG. 3

VISION TRANSFORMER FOR MOBILENET SIZE AND SPEED

TECHNICAL FIELD

The present subject matter relates to vision transformers for processing images.

BACKGROUND

Vision Transformer (ViT) networks have shown rapid progress in computer vision tasks, achieving promising results on various benchmarks. However, due to the massive number of parameters and model designs associated with ViT networks, ViT-based models are generally slower than lightweight convolutional networks in performing computer vision tasks and, thus, are not suitable for mobile networks.

BRIEF DESCRIPTION OF THE DRAWINGS

The drawing figures depict one or more implementations, by way of example only, not by way of limitations. In the figures, like reference numerals refer to the same or similar elements.

Features of the various implementations disclosed will be readily understood from the following detailed description, in which reference is made to the appended drawing figures. A reference numeral is used with each element in the description and throughout the several views of the drawing. When a plurality of similar elements is present, a single reference numeral may be assigned to like elements, with an added letter referring to a specific element.

Figure 1A:
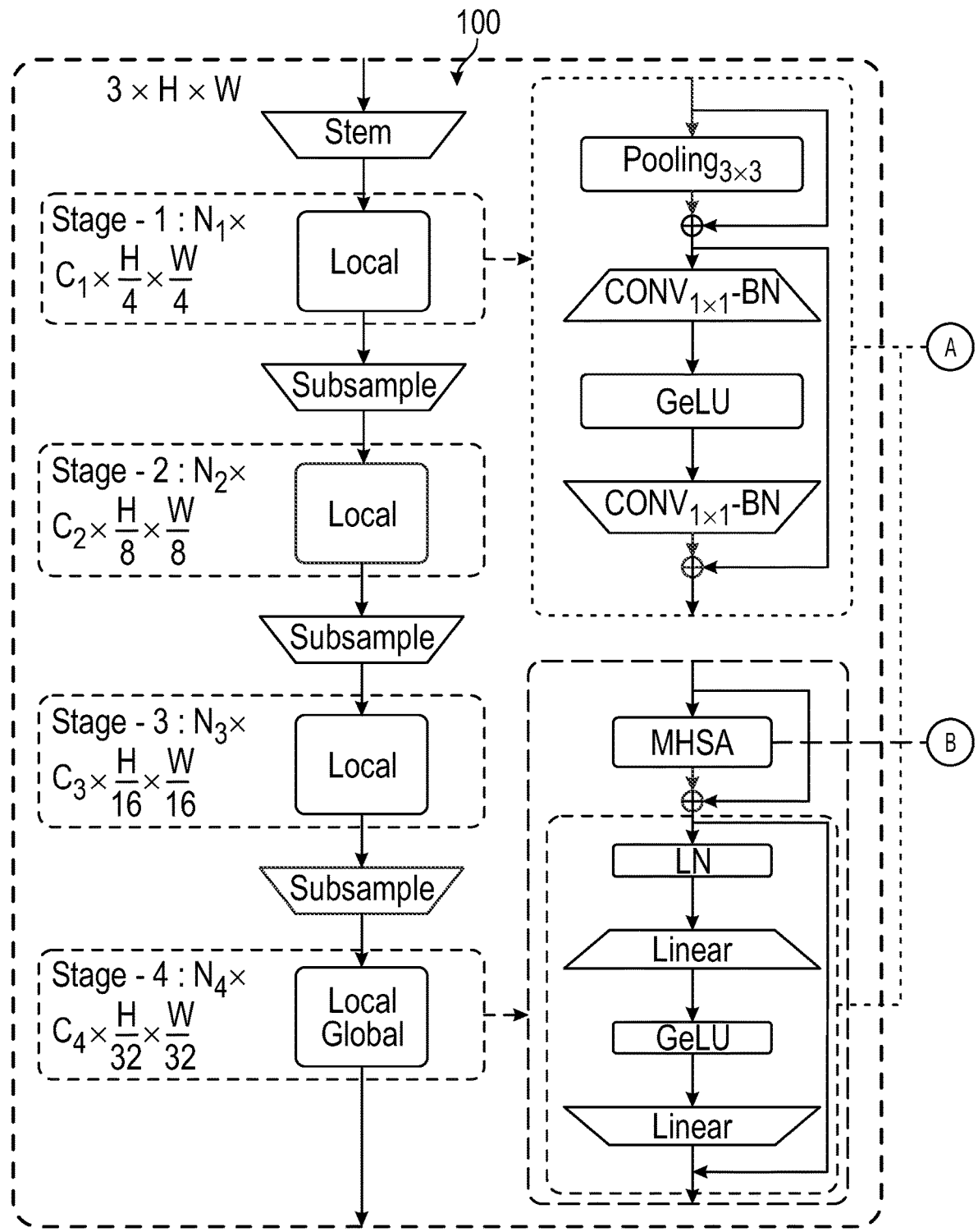
Figure 1E:
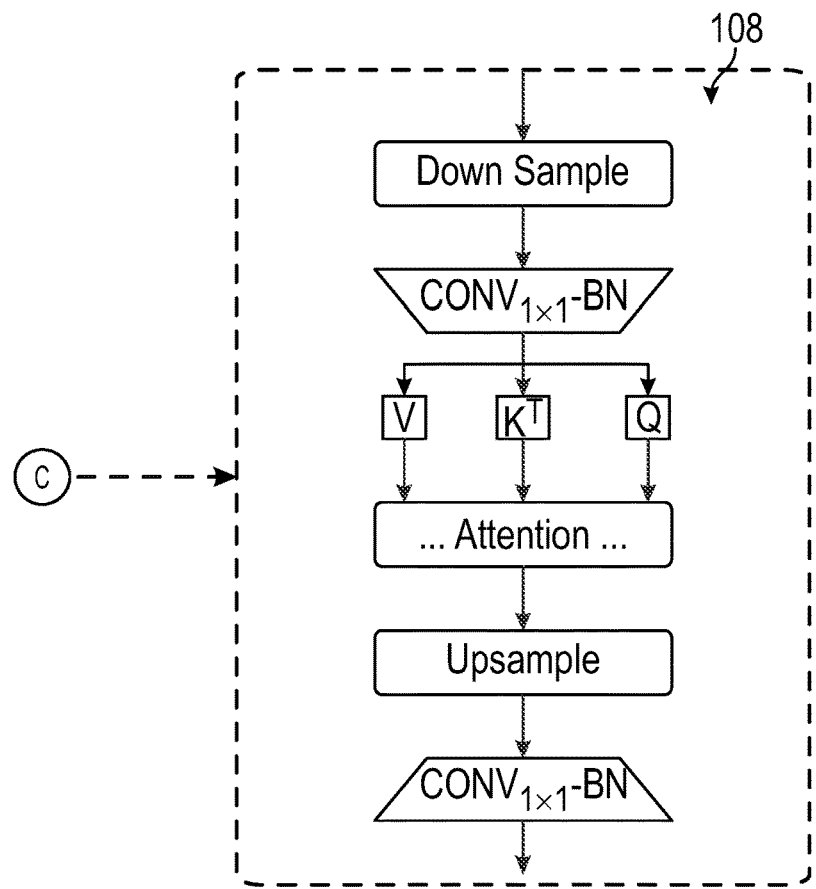
Figure 1F:
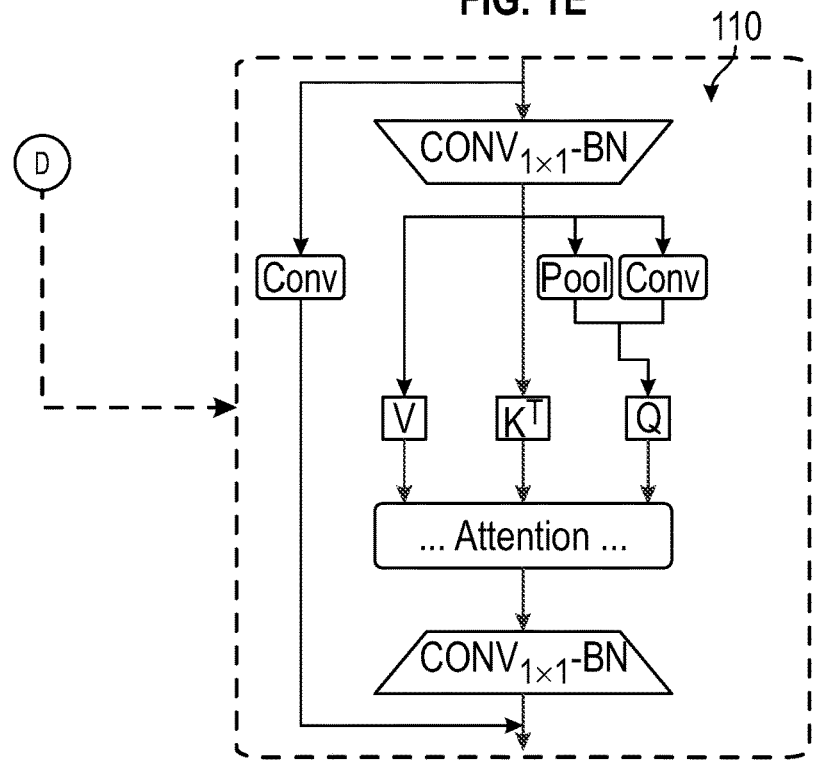
Figure 2:
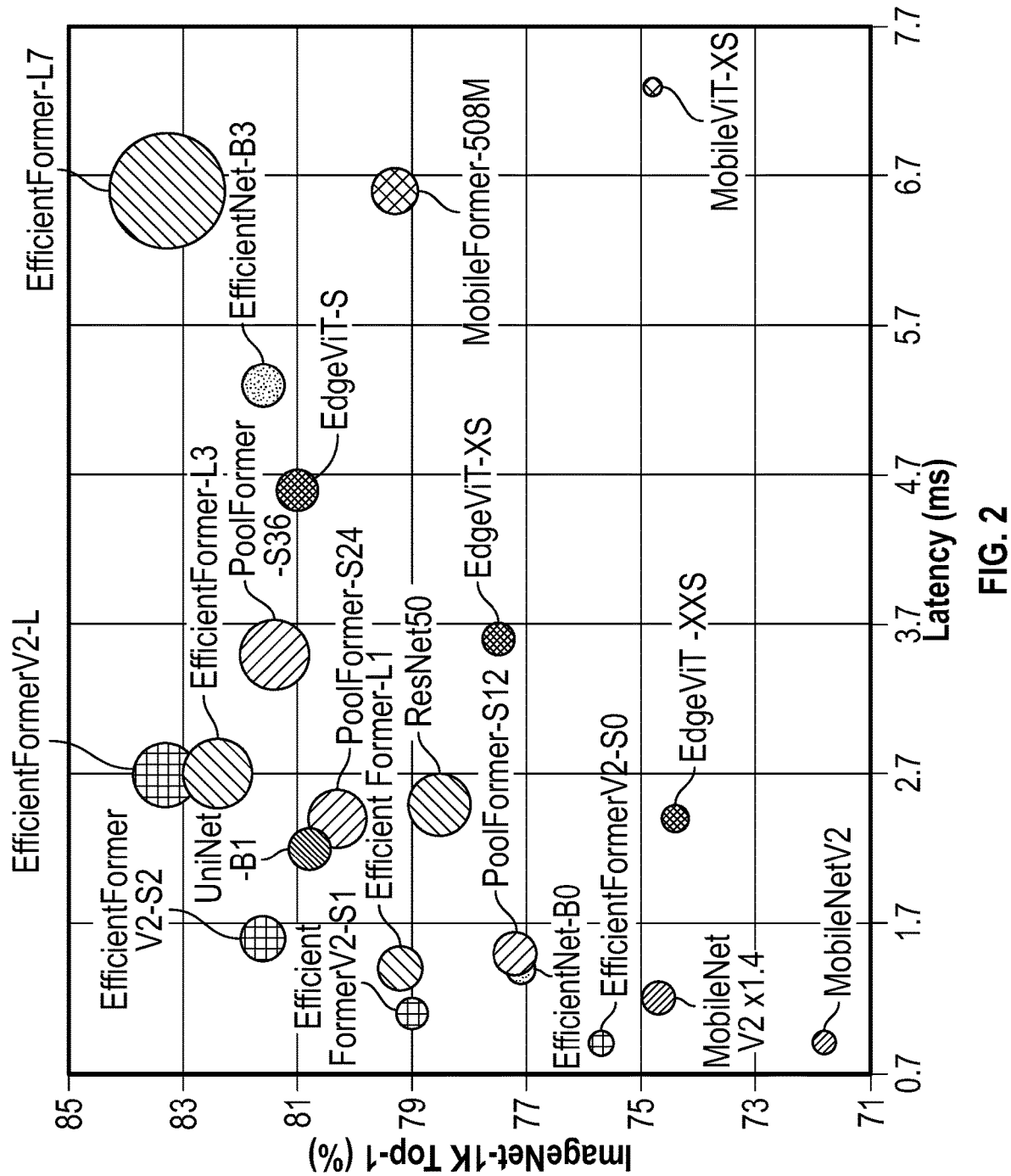
Figure 4:
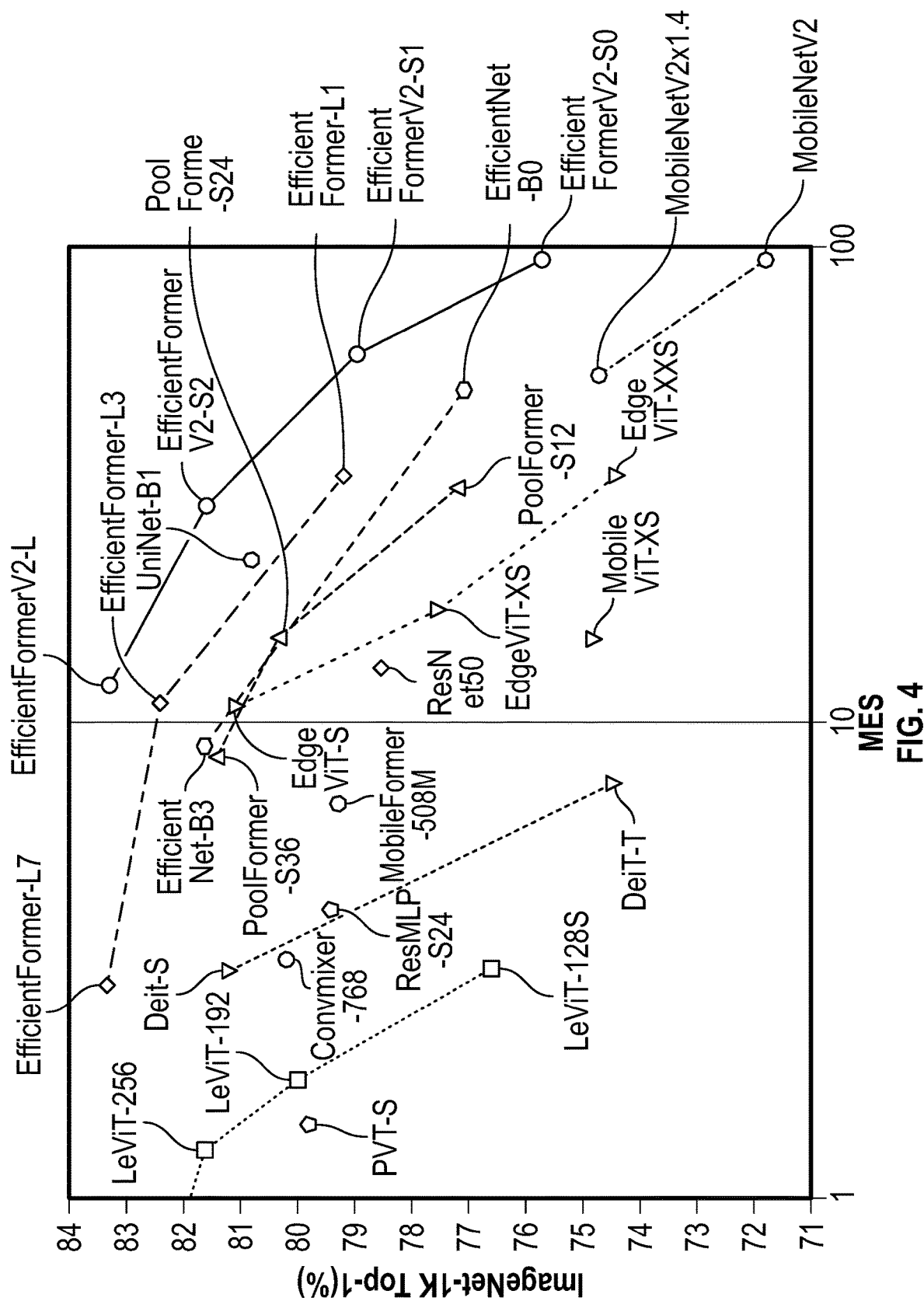
Figure 5:
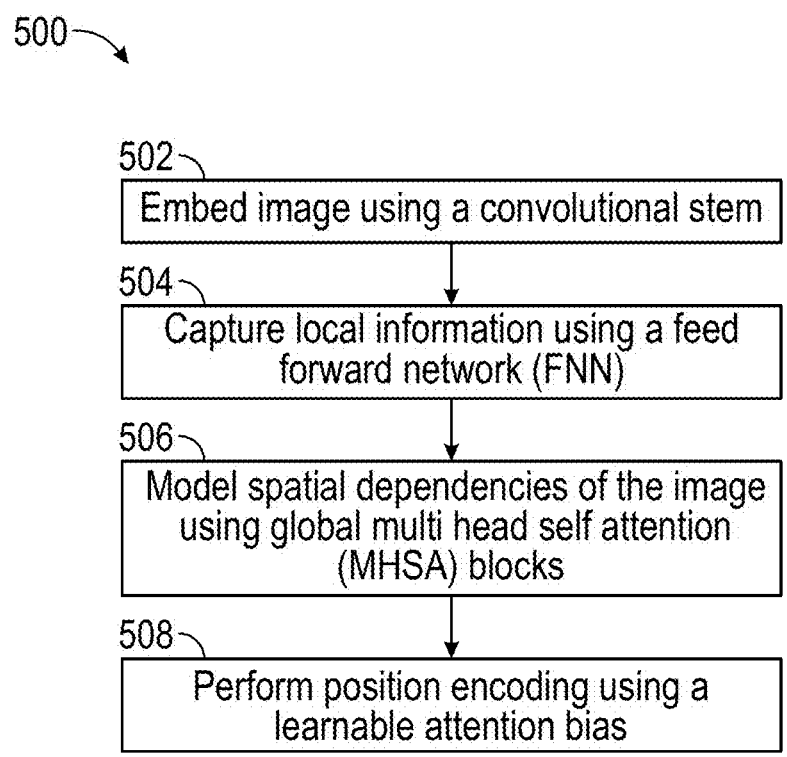
Figure 6:
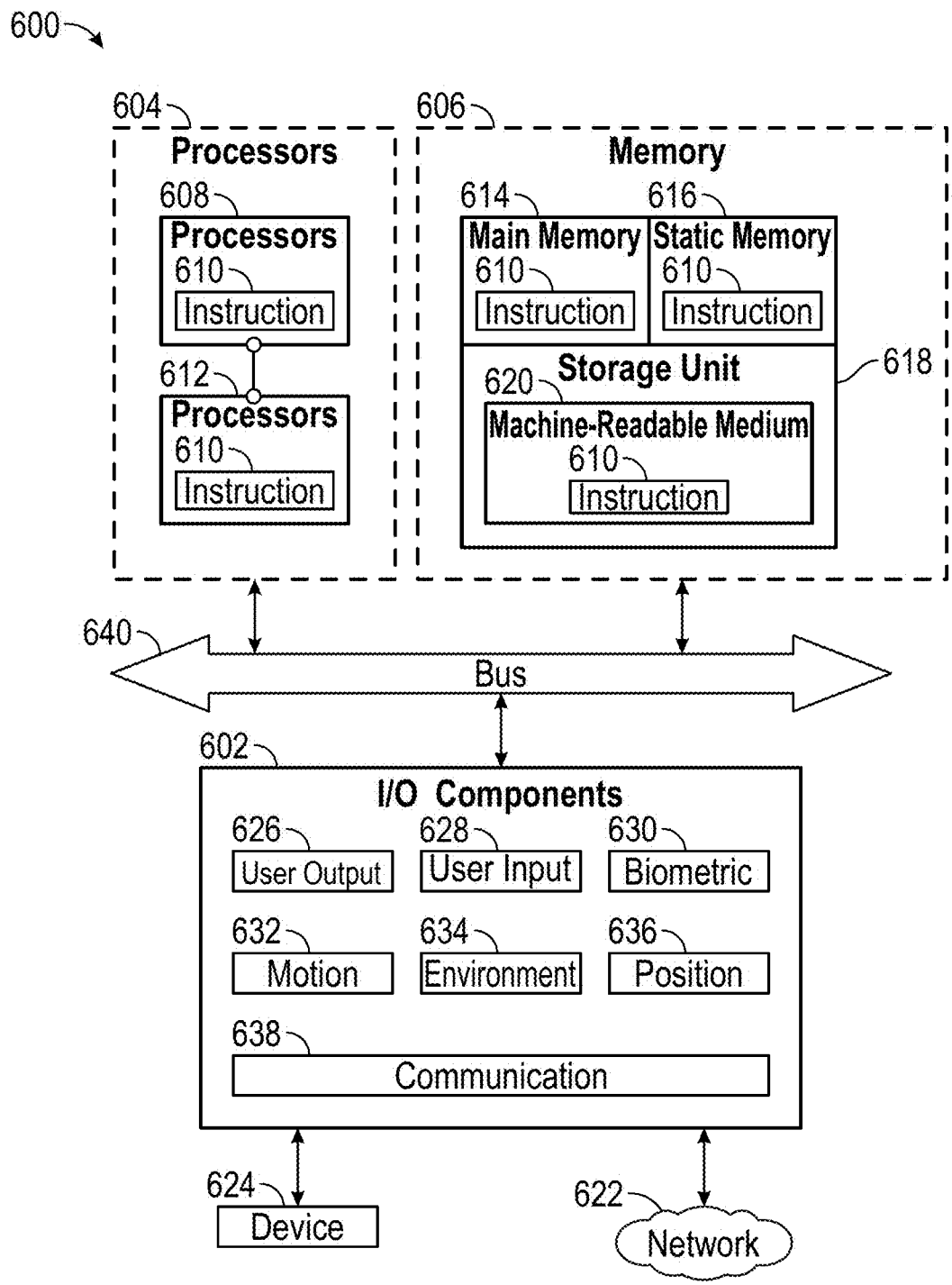
Figure 7:
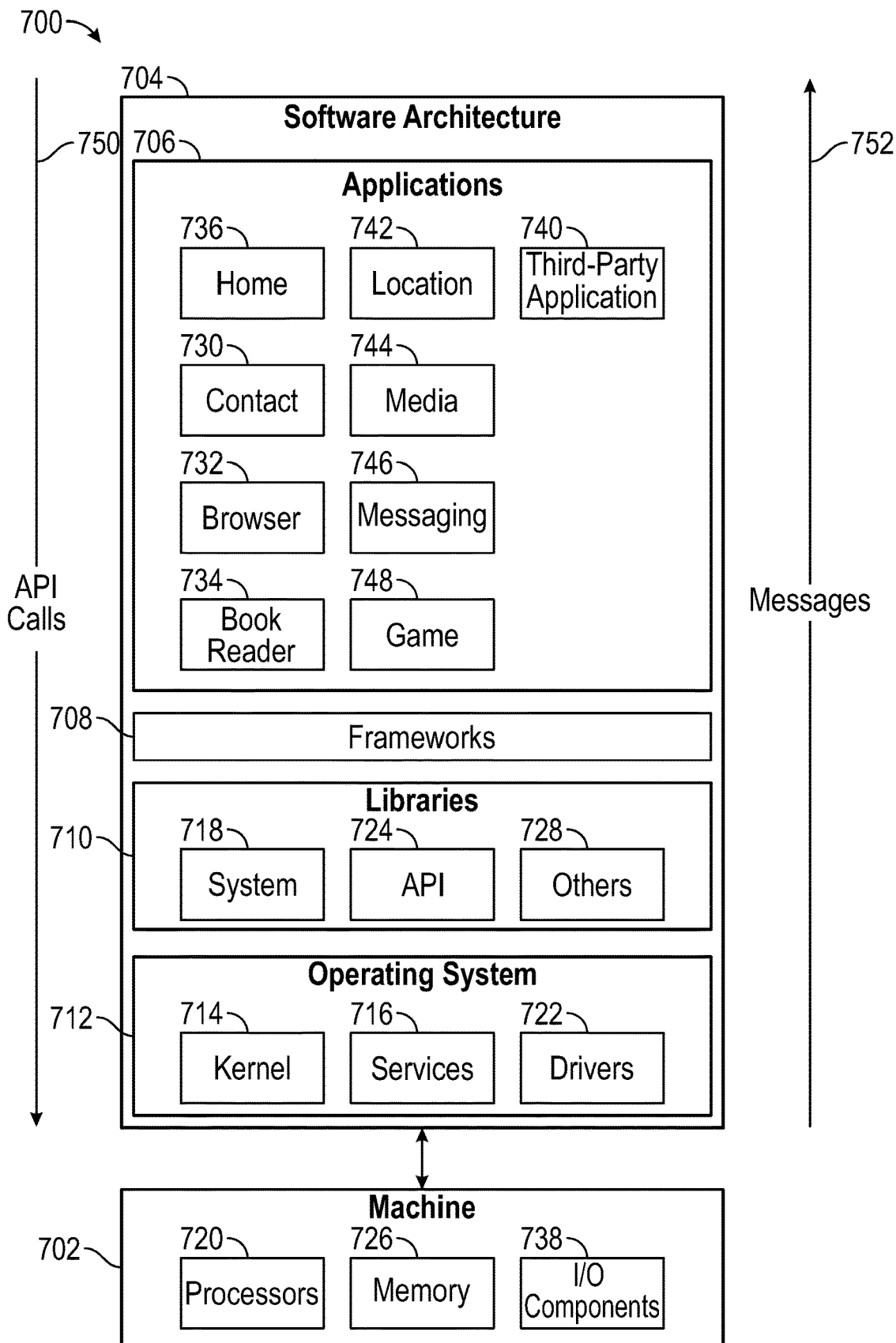

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures:

FIG. 1A is a block diagram of an EfficientFormer network that serves as a baseline network;

FIG. 1B is a block diagram of a unified Feed Forward Network (FFN);

FIG. 1C is a block diagram of Multi Head Self Attention (MHSA) improvements;

FIG. 1D and FIG. 1E are block diagrams of networks with attention on higher resolution;

FIG. 1F is a block diagram of an EfficientFormerV2 network with attention downsampling;

FIG. 2 is a graph comparing model size, speed and performance of various vision networks;

FIG. 3 is a search algorithm of the EfficientFormerV2 network;

FIG. 4 is a graph of MES vs. Accuracy showing the EfficientFormerV2 network having superior MES and accuracy on ImageNet-1K compared to other vision networks;

FIG. 5 is a flowchart depicting a method of operating the EfficientFormerV2 network;

FIG. 6 is a block diagram of a machine within which instructions for perform any one or more of the methodologies described herein may be executed; and FIG. 7 is a block diagram of a software architecture within which examples described herein may be implemented.

DETAILED DESCRIPTION

A mobile vision transformer network for use on mobile devices, such as smart eyewear devices and other augmented reality (AR) and virtual reality (VR) devices. The mobile vision transformer network considers factors including number of parameters, latency, and model performance, which reflect disk storage, mobile frames per second (FPS), and application quality, respectively. The mobile vision transformer network processes images, e.g., for image classification, segmentation, and detection. The mobile vision transformer network has a fine-grained architecture including an improved search algorithm performing latency-driven slimming that jointly improves model size and speed. With the improved architecture and search algorithm, a series of models under various constraints of model size and speed are obtained while maintaining high performance (the "EfficientFormerV2 network"). The EfficientFormerV2 network achieves ultra-fast inference and ultra-tiny model size, outperforming previous mobile vision networks by a large margin, and serve as a strong backbone in various vision tasks.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

The terms "coupled" or "connected" as used herein refer to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element that is integrated into or supported by the element.

The term "proximal" is used to describe an item or part of an item that is situated near, adjacent, or next to an object or person; or that is closer relative to other parts of the item, which may be described as "distal." For example, the end of an item nearest an object may be referred to as the proximal end, whereas the generally opposing end may be referred to as the distal end.

Also, to the extent used herein, any directional term, such as front, rear, inward, outward, toward, left, right, lateral, longitudinal, up, down, upper, lower, top, bottom, side, horizontal, vertical, and diagonal are used by way of example only, and are not limiting as to the direction or orientation of any camera or inertial measurement unit as constructed or as otherwise described herein.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings.

Vision Transformer (ViT) networks have shown rapid progress in computer vision (CV) tasks, achieving promising results on various benchmarks. ViT networks may be used to perform image classification, segmentation, and detection. However, due to the massive number of parameters and model design, e.g., attention mechanism, conventional ViT-based models are generally much slower than lightweight convolutional networks. Therefore, the deployment of ViT networks for real-time applications is particularly challenging, especially on resource-constrained hardware such as mobile devices. Recent efforts have tried to reduce the computation complexity of ViT networks through network architecture search or hybrid design with MobileNet block, yet the inference speed is still unsatisfactory.

Referring to the mobile vision network architectures shown FIG. 1A-FIG. 1F, three metrics are considered, i.e., model performance, size, and inference speed. This disclosure improves on these metrics without hurting others. FIG. 1A illustrates a block diagram of an EfficientFormer network 100 that serves as a baseline network. FIG. 1B illustrates a block diagram of a unified Feed Forward Network (FFN) 102. FIG. 1C illustrates a block diagram of a Multi Head Self Attention (MHSA) improvements at 104. FIG. 1D and FIG. 1E illustrate a block diagram of networks 106 and 108, respectively, with attention on higher resolution. FIG. 1F illustrates a block diagram of the EfficientFormerV2 network 110 with attention downsampling.

Incorporating local information may improve network performance and make ViT networks more robust in the absence of explicit positional embedding. As illustrated in FIG. 1A, a PoolFormer network and an EfficientFormer network employ 3×3 average pooling layers as a local token mixer. Replacing these layers with depth-wise convolutions (DWCONV) of the same kernel size does not introduce latency overhead, while the performance is improved by 0.6% with negligible extra parameters (0.02 M). Further, it is also beneficial to inject local information modeling layers in the FFN in ViT networks to boost performance with minor overhead. In one example, by placing extra depth wise 3×3 convolutions in FFNs to capture local information, the functionality of an original local mixer (pooling or convolution) is duplicated.

As shown at 102 in FIG. 1B, based on these observations, the explicit residual-connected local token mixer is removed, and the dept-wise 3×3 CONV is moved into the FFN to get a unified FFN with locality enabled. The unified FFN is applied to all stages of the network, as shown in FIG. 1A and FIG. 1B. This design modification simplifies the network architecture to two types of blocks (local FFN and global attention), and boosts the accuracy to 80.3% at the same latency as shown in Table 4, being the overhead in parameters minor (0.1 M). Additionally, this modification allows directly searching the network depth with the exact number of modules in order to extract local and global information, e.g., at late stages of the network.

With the unified FFN and the deletion of residual-connected token mixer, the search space is examined to determine whether the EfficientFormer network is still sufficient, especially in terms of depth. The network depth (number of blocks in each stage) and width (number of channels) are varied, such that a deeper and narrower network leads to better accuracy (0.2% improvement), less parameters (0.13 M reduction), and lower latency (0.1 ms acceleration), as shown in Table 4. Therefore, this network is set as a new baseline (accuracy 80.5%) to validate subsequent design modifications, and enable a deeper supernet for architecture search.

In addition, 5-stage models with further down-sized spatial resolution (1/64) have been employed in efficient ViT network arts. To justify whether to search from a 5-stage supernet, an extra stage to current baseline network is appended, and the performance gain and overhead is verified. It is noteworthy that though computation overhead is not a concern given the small feature resolution, the additional stage is parameter intensive. As a result, the network dimension (depth or width) is shrunk to align parameters and latency to the baseline model for fair comparison. As seen in Table 4, the best performance of the 5-stage model surprisingly drops to 80.31% with more parameters (0.39 M) and latency overhead (0.2 ms), despite the saving in MACs (0.12G). The fifth stage is computation efficient but parameter intensive. Given that the 5-stage network can not introduce more potentials in size & speed scope, a 4-stage design is chosen. Some ViT networks may offer an excellent Pareto curve in MACs-Accuracy, but tend to be quite redundant in size. Thus, optimizing single metrics may be easily trapped, for which the joint search disclosed herein provides a feasible solution.

Two approaches for MHSA are now described for improving performance of attention modules without raising extra overhead in model size and latency. The approaches are illustrated at 104 in FIG. 1C. In a first approach, local information is injected into a Value matrix (V) by adding a depth-wise 3×3 CONV. In a second approach, communications are enabled between attention heads by adding fully connected layers across head dimensions that are shown as Talking Head. With these modifications, the performance is further boosted to 80.8% with similar parameters and latency compared to the baseline network 100 in FIG. 1A.

An attention mechanism is beneficial to performance. However, applying an attention mechanism to high-resolution features harms mobile efficiency since it has quadratic time complexity corresponding to spatial resolution. MHSA is efficiently applied at higher resolutions (early stages). In the baseline network 100 of FIG. 1A, MHSA is employed in the last stage with 1/32 spatial resolution of the input images. Extra MHSA is applied to the second last stage with 1/16 feature size to observe a 0.9% gain in accuracy. On the down side, the inference speed slows down by almost 2.7×. It is therefore desirable to reduce complexity of the attention modules.

Although window-based attention, or downsampled Keys and Values may alleviate this problem, they are not best-suited options for mobile deployment. Window-based attention is difficult to accelerate on mobile devices due to the sophisticated window partitioning and reordering. As for downsampling Keys (K) and Values (V), full resolution Queries (Q) are required to preserve the output resolution (Out) after attention matrix multiplication as shown in Equation 1:

$$\text{Out}_{[B,H,N,C]} = \left(Q_{[B,H,N,C]} \cdot K^T_{[B,H,C,\frac{N}{2}]}\right) \cdot V_{[B,H,\frac{N}{2},C]}, \quad (1)$$

where B, H, N, C denotes batch size, number of heads, number of tokens, and channel dimension respectively.

Based on tests, the latency of the model merely drops to 2.8 ms, which is still 2× slower than the baseline network 100.

Therefore, to perform MHSA at the earlier stages of the network, Query, Key, and Value are downsampled to a fixed spatial resolution (1/32) and the outputs are interpolated from the attention back to the original resolution to feed into the next layer, as shown in FIG. 1D and FIG. 1E. This method is referred to as Stride Attention. As shown in Table 4, this simple approximation significantly reduces the latency from 3.5 ms to 1.5 ms and preserves a competitive accuracy (81.5% vs. 81.7%).

Most vision backbones utilize strided convolutions or pooling layers to perform a static and local downsampling and form a hierarchical structure. Some recent work starts to explore attention downsampling. For instance, LeViT and UniNet propose to halve feature resolution via attention mechanism to enable context-aware downsampling with the global receptive field. Specifically, the number of tokens in Query is reduced by half so that the output from the attention module is downsampled:

$$\text{Out}_{[B,H,\frac{N}{2},C]} = \left(Q_{[B,H,\frac{N}{2},C]} \cdot K^T_{[B,H,C,N]}\right) \cdot V_{[B,H,N,C]}. \quad (2)$$

However, it is nontrivial to decide how to reduce the number of tokens in Query. To achieve acceptable inference speed on mobile devices, applying attention downsampling to early stages with high resolution is not favorable, restricting the values of existing works that search different downsampling approaches at higher-resolution.

Instead, this disclosure includes a combined strategy that wields both locality and global dependency, as shown in the EfficientFormerV2 Network 110 in FIG. 1F. To get downsampled Queries, pooling is used as static local downsampling, 3×3 DWCONV as learnable local downsampling, and combine and project the results into Query dimension. In addition, the attention downsampling module is residual connected to a regular strided CONV to form a local-global manner, similar to the downsampling bottlenecks in or inverted bottlenecks. As shown in Table 4, with slightly more parameters and latency overhead, the accuracy of the EfficientFormerV2 Network 110 is improved to 81.8% with attention downsampling.

As described, the current art merely focus on optimizing one metric, and thus are either redundant in size or slow in inference. The EfficientFormerV2 network 110 jointly optimizes model size and speed to provide the most suitable vision network backbones for mobile deployment, shown as the supernet design of the EfficientFormerV2 network 110 and its search algorithm.

The EfficientFormerV2 network 110 includes a 4-stage hierarchical design which obtains feature sizes in {1/4, 1/8, 1/16, 1/32} of the input resolution. The EfficientFormerV2 network 110 starts with a small kernel convolution stem to embed input image instead of using inefficient embedding of non-overlapping patches:

$$\mathbb{X}^{B,C_j|_{j=1},\frac{H}{4},\frac{W}{4}}_{i|_{i=1},j|_{j=1}} = \text{stem}(\mathbb{X}_0^{B,3,H,W}), \quad (3)$$

where B denotes the batch size, C refers to channel dimension (also represents the width of the network), H and W are the height and width of the feature, $\mathbb{X}_j$ is the feature in stage j, j∈{1,2,3,4}, and i indicates the i-th layer. The first two stages capture local information on high resolutions, thus only the unified FFN of FIG. 1B is used:

$$\mathbb{X}^{B,C_j,\frac{H}{2^{j+1}},\frac{W}{2^{j+1}}}_{i+1,j} = S_{i,j} \cdot \text{FFN}^{C_j,E_{i,j}}(\mathbb{X}_{i,j}) + \mathbb{X}_{i,j}, \quad (4)$$

where $S_{i,j}$ is a learnable layer scale and the FFN is constructed by two properties: stage width $C_j$ and a per-block expansion ratio $E_{i,j}$. Note that each FFN is residual connected. In the last two stages, both local FFN and global MHSA blocks are used. Therefore, on top of Eqn. 4, global blocks are defined as:

$$\mathbb{X}^{B,C_j,\frac{H}{2^{j+1}},\frac{W}{2^{j+1}}}_{i+1,j} = S_{i,j} \cdot \text{MHSA}(\text{Proj}(\mathbb{X}_{i,j})) + \mathbb{X}_{i,j}, \quad (5)$$

where Queries (Q), Keys (K) and Values (V) are projected from input features through linear layers Q, K, V←Proj($\mathbb{X}_{i,j}$), and $$\text{MHSA}(Q, K, V) = \text{Softmax}(Q \cdot K^T + ab) \cdot V, \quad (6)$$

with attention bias as a learnable attention bias for position encoding. Bias is a phenomenon that skews the result of an algorithm in favor or against an idea. Bias is considered a systematic error that occurs in the machine learning model itself due to incorrect assumptions in the ML process.

Though the baseline EfficientFormer network 100 is found by latency-driven search and wields fast inference speed on a mobile device, there are two major drawbacks for the search algorithm. First, the search process is merely constrained by speed, resulting in the final models being parameter redundant, as shown in FIG. 2. Models are trained on ImageNet-1K to get top-1 accuracy. Latency is profiled by an iPhone 12® (iOS 16). The area of each circle is proportional to the number of parameters (model size). The EfficientFormerV2 network 110 achieves high performance with small model sizes and faster inference speed. Second, the EfficientFormer network 100 only searches for depth (number of blocks $N_j$ per stage) and stage width $C_j$, which is in a coarse-grained manner. The majority of computations and parameters of the network are in FFNs, and the parameter and computation complexity are linearly related to its expansion ratio $E_{i,j}$. $E_{i,j}$ can be specified independently for each FFN without the necessity to be identical. Thus, searching $E_{i,j}$ enables a more fine-grained search space where the computations and parameters can distribute flexibly and non-uniformly within each stage. This is a missing property in most recent ViT NAS arts, where $E_{i,j}$ remains identical per stage. The search algorithm of the EfficientFormerV2 Network 110 has a flexible per-block configuration, with joint constraints on size and speed best suited for mobile devices.

Given that the size and latency of a network matter when evaluating mobile-friendly models, a generic and fair metric that better understands the performance of a network on mobile devices is considered. Without loss of generality, a Mobile Efficiency Score (MES) is defined as:

$$\text{MES} = \text{Score} \cdot \prod_i \left(\frac{M_i}{U_i}\right)^{-\alpha_i}, \quad (7)$$

where i∈{size, latency, . . . } and $\alpha_i \in (0,1]$ indicate the corresponding importance. $M_i$, and $U_i$ represent the metric and its unit. Score is a pre-defined base score set as 100 for simplicity. Model size is calculated by the number of parameters, and latency is measured as a running time when deploying models on devices. Since the focus is on mobile deployment, the size and speed of MobileNetV2 are used as the unit. Specifically, $U_{size}=3$ M, and $U_{latency}$ is defined as 1 ms latency on an iPhone 12® (iOS 16) deployed with CoreMLTools. To emphasize speed, set $\alpha_{latency}=1.0$ and $\alpha_{size}=0.5$. Decreasing size and latency can lead to a higher MES, and Pareto optimality is searched on MES-Accuracy. The form of MES is general and can be extended to other metrics of interest, such as inference-time memory footprint and energy consumption. Furthermore, the importance of each metric is easily adjustable by appropriately defining al.

Search space consists of: (i) the depth of the network, measured by the number of blocks $N_j$ per stage, (ii) the width of the network, i.e., the channel dimension $C_j$ per stage, and (iii) expansion ratio $E_{i,j}$ of each FFN. The amount of MHSA can be seamlessly determined during depth search, which controls the preservation or deletion of a block in the supernet. Thus, every block is set as MHSA followed by FFN in the last two stages of the supernet and obtain subnetworks with the desired number of global MHSA by depth search.

Supernet is constructed by using a slimmable network that executes at elastic depth and width to enable a pure evaluation-based search algorithm. Elastic depth can be naturally implemented through stochastic drop path augmentation. As for width and expansion ratio, switchable layers are constructed with shared weights but independent normalization layers, such that the corresponding layer can execute at different channel numbers from a predefined set, i.e., multiples of 16 or 32. Specifically, the expansion ratio $E_{i,j}$ is determined by the channels of the depth-wise 3×3 Conv in each FFN, and stage width $C_j$ is determined by aligning the output channels of the last projection (1×1 Conv) of FFN and MHSA blocks. The switchable execution can be expressed as:

$$\hat{\mathbb{X}}_i = \gamma_c \cdot \frac{w^{:c} \cdot \mathbb{X}_i - \mu_c}{\sqrt{\sigma_c^2 + \epsilon}} + \beta_c, \tag{8}$$

where $w^{:c}$ refers to slicing the first c filters of the weight matrix to obtain a subset of output, and $\gamma_c$, $\beta_c$, $\mu_c$, and $\sigma_c$ are the parameters and statistics of the normalization layer designated for width c. The supernet is pre-trained with Sandwich Rule by training the largest, the smallest, and randomly sampled two subnets at each iteration (these subnets are denoted as max, m, rand-1, and rand-2) as shown in the algorithm shown in FIG. 3.

The number of parameters are reported in Table 1 below, i.e., Params (M), GMACs, Training Epochs, and Top-1 accuracy for various methods. The latency results are obtained by running models on iPhone 12® (Neural Engine) compiled with CoreMLTools, Pixel 6 (CPU) compiled with XNNPACK, and Nvidia® A100 (GPU) compiled with TensorRT. The batch size is 1 for models tested on iPhone i2® and Pixel 6, and 64 for A100. (−) denotes unrevealed or unsupported models.

TABLE 1

| Model | Type | Params (M) | GMACs | Latency (ms) iPhone 12 | Latency (ms) Pixel 6 | Latency (ms) A100 | MES↑ | Epochs | Top-1(%) |
|---|---|---|---|---|---|---|---|---|---|
| MobileNetV2 × 1.0 | CONV | 3.5 | 0.3 | 0.9 | 25.3 | 5.0 | 102.9 | 300 | 71.8 |
| MobileViT-XS | Hybrid | 2.3 | 0.7 | 7.3 | 64.4 | 11.7 | 15.6 | 300 | 74.8 |
| EdgeViT-XXS | Hybrid | 4.1 | 0.6 | 2.4 | 30.9 | 11.3 | 35.6 | 300 | 74.4 |
| [gray]0.92 EfficientFormerV2-S0 | Hybrid | 3.5 | 0.40 | 0.9 | 20.8 | 6.6 | 102.9 | 300 | 75.7 |
| MobileNetV2 × 1.4 | CONV | 6.1 | 0.6 | 1.2 | 42.8 | 7.3 | 58.4 | 300 | 74.7 |
| EfficientNet-B0 | CONV | 5.3 | 0.4 | 1.4 | 29.4 | 10.0 | 53.7 | 350 | 77.1 |
| DeiT-T | Attention | 5.9 | 1.2 | 9.2 | 66.6 | 7.1 | 7.8 | 300 | 74.5 |
| EdgeViT-XS | Hybrid | 6.7 | 1.1 | 3.6 | 55.5 | 14.3 | 18.6 | 300 | 77.5 |
| LeViT-128S | Hybrid | 7.8 | 0.31 | 19.9 | 15.5 | 3.4 | 3.1 | 1000 | 76.6 |
| [gray]0.92 EfficientFormerV2-S1 | Hybrid | 6.1 | 0.65 | 1.1 | 33.3 | 8.8 | 63.8 | 300 | 79.0 |
| EfficientNet-B3 | CONV | 12.0 | 1.8 | 5.3 | 123.8 | 35.0 | 9.4 | 350 | 81.6 |
| PoolFormer-s12 | Pool | 12 | 2.0 | 1.5 | 82.4 | 14.5 | 33.3 | 300 | 77.2 |
| LeViT-192 | Hybrid | 10.9 | 0.66 | 29.6 | 30.1 | 5.2 | 1.8 | 1000 | 80.0 |
| MobileFormer-508M | Hybrid | 14.0 | 0.51 | 6.6 | 55.2 | 14.6 | 7.0 | 450 | 79.3 |
| UniNet-B1 | Hybrid | 11.5 | 1.1 | 2.2 | 57.7 | 16.9 | 23.2 | 300 | 80.8 |
| EdgeViT-S | Hybrid | 11.1 | 1.9 | 4.6 | 92.5 | 21.2 | 11.3 | 300 | 81.0 |
| EfficientFormer-L1 | Hybrid | 12.3 | 1.3 | 1.4 | 50.7 | 8.4 | 35.3 | 300 | 79.2 |
| [gray]0.92 EfficientFormerV2-S2 | Hybrid | 12.6 | 1.25 | 1.6 | 57.2 | 14.5 | 30.5 | 300 | 81.6 |
| ResNet50 | CONV | 25.5 | 4.1 | 2.5 | 167.5 | 9.0 | 13.7 | 300 | 78.5 |
| ConvNext-T | CONV | 29.0 | 4.5 | 83.7 | 340.5 | 28.8 | 0.4 | 300 | 82.1 |
| ResMLP-S24 | SMLP | 30 | 6.0 | 7.6 | 325.4 | 17.4 | 4.2 | 300 | 79.4 |
| PoolFormer-s24 | Pool | 21 | 3.6 | 2.4 | 154.3 | 28.2 | 15.7 | 300 | 80.3 |
| PoolFormer-s36 | Pool | 31 | 5.2 | 3.5 | 224.9 | 41.2 | 8.9 | 300 | 81.4 |
| DeiT-S | Attention | 22.5 | 4.5 | 11.8 | 218.2 | 15.5 | 3.1 | 300 | 81.2 |
| PVT-Small | Attention | 24.5 | 3.8 | 24.4 | — | 23.8 | 1.4 | 300 | 79.8 |
| T2T-ViT-14 | Attention | 21.5 | 4.8 | — | — | 21.0 | — | 310 | 81.5 |
| Swin-Tiny | Attention | 29 | 4.5 | — | — | 22.0 | — | 300 | 81.3 |
| CSwin-T | Attention | 23 | 4.3 | — | — | 28.7 | — | 300 | 82.7 |
| LeViT-256 | Hybrid | 18.9 | 1.12 | 31.4 | 50.7 | 6.7 | 1.3 | 1000 | 81.6 |
| LeViT-384 | Hybrid | 39.1 | 2.35 | 48.8 | 102.2 | 10.2 | 0.6 | 1000 | 82.6 |
| Convmixer-768 | Hybrid | 21.1 | 20.7 | 11.6 | — | — | 3.3 | 300 | 80.2 |

TABLE 1-continued

| Model | Type | Params (M) | GMACs | Latency (ms) iPhone 12 | Latency (ms) Pixel 6 | Latency (ms) A100 | MES↑ | Epochs | Top-1(%) |
|---|---|---|---|---|---|---|---|---|---|
| EfficientFormer-L3 | Hybrid | 31.3 | 3.9 | 2.7 | 151.9 | 13.9 | 11.5 | 300 | 82.4 |
| EfficientFormer-L7 | Hybrid | 82.1 | 10.2 | 6.6 | 392.9 | 30.7 | 2.9 | 300 | 83.3 |
| EfficientFormerV2-L | Hybrid | 26.1 | 2.56 | 2.7 | 117.7 | 22.5 | 12.6 | 300 | 83.3 |
| EfficientFormerV2-L Supernet | Hybrid | 37.1 | 3.57 | 4.2 | — | — | 6.8 | 300 | 83.5 |

A search algorithm is shown at 300 in FIG. 3.

Since the supernet is executable at elastic depth and switchable width, the subnetworks are searched with the best Pareto curve by analyzing the efficiency gain and accuracy drop with respect to each slimming action. The action pool is defined as follows:

$$A \in \{A_{N[i,j]}, A_{C[j]}, A_{E[i,j]}\}, \quad (9)$$

where $A_{N[i,j]}$ denotes slimming each block, $A_{C[j]}$ refers to shrinking the width of a stage, and $A_{E[i,j]}$ denotes slimming each FFN to a smaller expansion.

Initializing the state with full depth and width (largest subnet), the accuracy outcome (ΔAcc) of each frontier action is evaluated on a validation partition of ImageNet-1K, which only takes about 4 GPU-minutes. Meanwhile, parameter reduction (ΔParams) are directly calculated from layer properties, i.e., kernel size, in-channels, and out-channels. The latency reduction (ΔLatency) is obtained through a pre-built latency look-up table measured on iPhone 12® with CoreMLTools. With the metrics in hand, AMES is computed through ΔParams and ΔLatency, and the action is chosen with the minimum per-MES accuracy drop:

$$\hat{A} \leftarrow \operatorname{argmin}_A \frac{\Delta Acc}{\Delta MES}.$$

It is noteworthy that though the action combination is enormous, the frontier one only needs to be evaluated at each step, which is linear in complexity.

Comparison results are shown in Table 2. The EfficientFormerV2 networks 110 achieve the state-of-the-art results on a single metric, i.e., number of parameters or latency. Regarding the model size, the EfficientFormerV2-S0 model outperforms EdgeViT-XXS by 1.3% top-1 accuracy with even 0.6 M fewer parameters and MobileNetV2×1.0 by 3.9% top-1 with similar number of parameters. For large models, the EfficientFormerV2-L model achieves identical accuracy to recent EfficientFormer-L7 while being 3.1× smaller. As for speed, with comparable or lower latency, the EfficientFormerV2-S2 model outperforms UniNet-B1, EdgeViT-S, and the EfficientFormer-L1 model by 0.8%, 0.6% and 2.4% top-1 accuracy, respectively. The results provide practical insight to inspire future architecture design: modern deep neural networks are robust to architecture permutation, optimizing the architecture with joint constraints, such as latency and model size, will not harm individual metrics.

The superior performance of EfficientFormerV2 is demonstrated when considering both model size and speed. MES is a more realistic metric to assess mobile efficiency than using size or latency alone. EfficientFormerV2-S1 outperforms MobileViT-XS, EdgeViT-XXS, and EdgeViT-XS by 4.2%, 4.6%, and 1.5% top-1, respectively, with far higher MES. With 1.8× higher MES, EfficientFormerV2-L outperforms MobileFormer-508 M by 4.0% top-1 accuracy. The visualization of MES vs. Accuracy is shown in FIG. 4, where the EfficientFormerV2 network 110 shows superior MES and accuracy on ImageNet-1K compared to existing work. MES is plotted in logarithmic scale.

The EfficientFormerV2 network 110 as backbone is integrated in a Mask-RCNN pipeline and experimented over a MS COCO 2017 dataset. The model is initialized with ImageNet-1K pretrained weights, using an AdamW optimizer with an initial learning rate as $2 \times 10^{-4}$, and trained for 12 epochs with a standard resolution (1333×800). As shown in Table 2, with a similar model size, the EfficientFormerV2-S2 network outperforms PoolFormer-S12 by 1.6 $AP^{box}$ and 0.9 $AP^{mask}$. The EfficientFormerV2-L network outperforms the EfficientFormer-L3 network by 1.0 $AP^{box}$ and 0.6 $AP^{mask}$.

TABLE 2

| Backbone | Params (M) | Detection & Instance Segmentation | | | | | |
|---|---|---|---|---|---|---|---|
| | | $AP^{box}$ | $AP_{50}^{box}$ | $AP_{75}^{box}$ | $AP^{mask}$ | $AP_{50}^{mask}$ | $AP_{75}^{mask}$ |
| ResNet18 | 11.7 | 34.0 | 54.0 | 36.7 | 31.2 | 51.0 | 32.7 |
| PoolFormer-S12 | 12.0 | 37.3 | 59.0 | 40.1 | 34.6 | 55.8 | 36.9 |
| EfficientFormer-L1 | 12.3 | 37.9 | 60.3 | 41.0 | 35.4 | 57.3 | 37.3 |
| EfficientFormerV2-S2 | 12.6 | 38.9 | 60.3 | 42.4 | 35.5 | 57.2 | 37.8 |
| ResNet50 | 25.5 | 38.0 | 58.6 | 41.4 | 34.4 | 55.1 | 36.7 |
| PoolFormer-S24 | 21.0 | 40.1 | 62.2 | 43.4 | 37.0 | 59.1 | 39.6 |
| Swin-T | 29.0 | 42.2 | 64.4 | 46.2 | 39.1 | 64.6 | 42.0 |
| EfficientFormer-L3 | 31.3 | 41.4 | 63.9 | 44.7 | 38.1 | 61.0 | 40.4 |
| EfficientFormerV2-L | 26.1 | 42.4 | 64.2 | 46.7 | 38.7 | 61.1 | 41.6 |

The EfficientFormerV2 network 110 was experimented on ADE20K, a challenging scene segmentation dataset with 150 categories. The EfficientFormerV2 models were integrated as a feature encoder in Semantic FPN. The EfficientFormerV2 network 110 was integrated as a feature encoder in Semantic FPN pipeline, with ImageNet-1K pretrained weights. The EfficientFormerV2 network 110 was trained on ADE20K for 40K iterations with batch size as 32 and learning rate as $2\times10^{-4}$ with a poly decay by the power of 0.9. Training resolution was 512×512, and a single scale testing was used on the validation set. As shown in Table 3, the EfficientFormerV2-S2 network outperforms Pool-Former-S12 and the EfficientFormer-L1 network by 2.3 and 0.6 mIoU, respectively.

TABLE 3

| Backbone | Params (M) | mIoU |
| --- | --- | --- |
| ResNet18 | 11.7 | 32.9 |
| PoolFormer-S12 | 12.0 | 37.2 |
| EfficientFormer-L1 | 12.3 | 38.9 |
| 0.92 EfficientFormerV2-S2 | 12.6 | 39.5 |

The search algorithm was compared with the vanilla one from EfficientFormer network 100. As seen in Table 4, the search algorithm obtains models with similar parameters and latency as EfficientFormer network 100 yet with higher accuracy, demonstrating the effectiveness of fine-grained search and joint optimization of latency and size.

TABLE 4

| Search Algorithm | Params (M) | Latency (ms) | Top-1 (%) |
| --- | --- | --- | --- |
| EfficientFormer | 6.9 | 1.2 | 79.1 |
| EfficientFormerV2 | 7.0 | 1.2 | 79.4 |
| EfficientFormer | 3.1 | 0.9 | 74.2 |
| EfficientFormerV2 | 3.1 | 0.9 | 75.0 |

FIG. 5 is a flow chart 500 depicting steps of a method for using the EfficientFormerV2 network 110 with a processor implementing the method. The EfficientFormerV2 network 110 includes a 4-stage hierarchical design which obtains feature sizes in $\{1/4, 1/8, 1/16, 1/32\}$ of the input resolution.

At block 502, an input image is embedded using a convolution stem. In an example, the processor implements the convolution stem as a small kernal convolution stem to embed the image.

At block 504, local information is captured on high resolutions of the image using a unified FNN. In an example, the processor implements the unified FNN constructed with two properties, a stage width and a per-block ratio. Each FFN is residual connected.

At block 506, spatial dependencies of the image are modeled using global multi head self attention (MHSA) blocks, described herein. In an example, the processor uses Queries (Q), Keys (K), and values (V) projected from input features through linear layers.

At block 508, position encoding is performed on the modeled spatial dependencies using a learnable attention bias. In an example, the processor optimizes speed and size of the EfficientFormerV2 network 110.

FIG. 6 is a diagrammatic representation of the machine 600 within which instructions 610 (e.g., software, a program, an application, an applet, an app, or other executable code) for causing the machine 600 to perform any one or more of the methodologies discussed herein may be executed. For example, the instructions 610 may cause the machine 600 to execute any one or more of the methods described herein. The instructions 610 transform the general, non-programmed machine 600 into a particular machine 600 programmed to carry out the described and illustrated functions in the manner described. The machine 600 may operate as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 610, sequentially or otherwise, that specify actions to be taken by the machine 600. Further, while only a single machine 600 is illustrated, the term "machine" shall also be taken to include a collection of machines that individually or jointly execute the instructions 610 to perform any one or more of the methodologies discussed herein. In some examples, the machine 600 may also comprise both client and server systems, with certain operations of a particular method or algorithm being performed on the server-side and with certain operations of the particular method or algorithm being performed on the client-side.

The machine 600 may include processors 604, memory 606, and input/output I/O components 602, which may be configured to communicate with each other via a bus 640. In an example, the processors 604 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 608 and a processor 612 that execute the instructions 610. The term "processor" is intended to include multi-core processors that may comprise two or more independent processors (sometimes referred to as "cores") that may execute instructions contemporaneously. Although FIG. 6 shows multiple processors 604, the machine 600 may include a single processor with a single core, a single processor with multiple cores (e.g., a multi-core processor), multiple processors with a single core, multiple processors with multiples cores, or any combination thereof.

The memory 606 includes a main memory 614, a static memory 616, and a storage unit 618, both accessible to the processors 604 via the bus 640. The main memory 606, the static memory 616, and storage unit 618 store the instructions 610 for any one or more of the methodologies or functions described herein. The instructions 610 may also reside, completely or partially, within the main memory 614, within the static memory 616, within machine-readable medium 620 within the storage unit 618, within at least one of the processors 604 (e.g., within the Processor's cache memory), or any suitable combination thereof, during execution thereof by the machine 600.

The I/O components 602 may include a wide variety of components to receive input, provide output, produce output, transmit information, exchange information, capture measurements, and so on. The specific I/O components 602 that are included in a particular machine will depend on the type of machine. For example, portable machines such as mobile phones may include a touch input device or other such input mechanisms, while a headless server machine will likely not include such a touch input device. It will be appreciated that the I/O components 602 may include many other components that are not shown in FIG. 6. In various examples, the I/O components 602 may include user output components 626 and user input components 628. The user output components 626 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 628 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 602 may include biometric components 630, motion components 632, environmental components 634, or position components 636, among a wide array of other components. For example, the biometric components 630 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 632 include acceleration sensor components (e.g., accelerometer), gravitation sensor components, rotation sensor components (e.g., gyroscope).

The environmental components 634 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

The position components 636 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 602 further include communication components 638 operable to couple the machine 600 to a network 622 or devices 624 via respective coupling or connections. For example, the communication components 638 may include a network interface Component or another suitable device to interface with the network 622. In further examples, the communication components 638 may include wired communication components, wireless communication components, cellular communication components, Near Field Communication (NFC) components, Bluetooth® components (e.g., Bluetooth® Low Energy), Wi-Fi components, and other communication components to provide communication via other modalities. The devices 624 may be another machine or any of a wide variety of peripheral devices (e.g., a peripheral device coupled via a USB).

Moreover, the communication components 638 may detect identifiers or include components operable to detect identifiers. For example, the communication components 638 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 638, such as location via Internet Protocol (IP) geolocation, location via Wi-Fi® signal triangulation, location via detecting an NFC beacon signal that may indicate a particular location, and so forth.

The various memories (e.g., main memory 614, static memory 616, and memory of the processors 604) and storage unit 618 may store one or more sets of instructions and data structures (e.g., software) embodying or used by any one or more of the methodologies or functions described herein. These instructions (e.g., the instructions 610), when executed by processors 604, cause various operations to implement the disclosed examples.

The instructions 610 may be transmitted or received over the network 622, using a transmission medium, via a network interface device (e.g., a network interface component included in the communication components 638) and using any one of several well-known transfer protocols (e.g., hypertext transfer protocol (HTTP)). Similarly, the instructions 610 may be transmitted or received using a transmission medium via a coupling (e.g., a peer-to-peer coupling) to the devices 624.

FIG. 7 is a block diagram 700 illustrating a software architecture 704, which can be installed on any one or more of the devices described herein. The software architecture 704 is supported by hardware such as a machine 702 that includes processors 720, memory 726, and I/O components 738. In this example, the software architecture 704 can be conceptualized as a stack of layers, where each layer provides a particular functionality. The software architecture 704 includes layers such as an operating system 712, libraries 710, frameworks 708, and applications 706. Operationally, the applications 706 invoke API calls 750 through the software stack and receive messages 752 in response to the API calls 750.

The operating system 712 manages hardware resources and provides common services. The operating system 712 includes, for example, a kernel 714, services 716, and drivers 722. The kernel 714 acts as an abstraction layer between the hardware and the other software layers. For example, the kernel 714 provides memory management, processor management (e.g., scheduling), component management, networking, and security settings, among other functionalities. The services 716 can provide other common services for the other software layers. The drivers 722 are responsible for controlling or interfacing with the underlying hardware. For instance, the drivers 722 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 710 provide a common low-level infrastructure used by the applications 706. The libraries 710 can include system libraries 718 (e.g., C standard library) that provide functions such as memory allocation functions, string manipulation functions, mathematic functions, and the like. In addition, the libraries 710 can include API libraries 724 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 710 can also include a wide variety of other libraries 728 to provide many other APIs to the applications 706.

The frameworks 708 provide a common high-level infrastructure that is used by the applications 706. For example, the frameworks 708 provide various graphical user interface (GUI) functions, high-level resource management, and high-level location services. The frameworks 708 can provide a broad spectrum of other APIs that can be used by the applications 706, some of which may be specific to a particular operating system or platform.

In an example, the applications 706 may include a home application 736, a contacts application 730, a browser application 732, a book reader application 734, a location application 742, a media application 744, a messaging application 746, a game application 748, and a broad assortment of other applications such as a third-party application 740. The applications 706 are programs that execute functions defined in the programs. Various programming languages can be employed to generate one or more of the applications 706, structured in a variety of manners, such as object-oriented programming languages (e.g., Objective-C, Java, or C++) or procedural programming languages (e.g., C or assembly language). In a specific example, the third-party application 740 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 740 can invoke the API calls 750 provided by the operating system 712 to facilitate functionality described herein.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A system comprising a vision transformer, comprising:
   a convolution stem configured to embed an image, wherein the convolutional stem is represented by:

$$\mathbb{X}^{B,C_j}_{i|_{i=1},j|_{j=1}}{}^{,\frac{H}{4},\frac{W}{4}} = \text{stem}(\mathbb{X}_0^{B,3,H,W})$$

where B denotes a batch size, C refers to a channel dimension, H and W are a height and a width of a feature, $\mathbb{X}_j$ is a feature in stage j, j E {1, 2, 3, 4}, and i indicates the i-th layer;
   a unified feed forward network (FNN) coupled to the convolution stem and configured to capture local information, wherein the unified FNN is represented by:

$$\mathbb{X}^{B,C_j,\frac{H}{2^{j+1}},\frac{W}{2^{j+1}}}_{i+1,j} = S_{i,j} \cdot FFN^{C_j,E_{i,j}}(\mathbb{X}_{i,j}) + \mathbb{X}_{i,j}$$

where $S_{i,j}$ is a learnable layer scale and the unified FNN is constructed by a stage width $C_j$ and a per-block expansion ratio $E_{i,j}$;

global multi head self attention (MHSA) blocks coupled to the FNN and configured to model spatial dependencies of the image; and
a learnable attention bias coupled to the MHSA blocks and configured to perform position encoding.

2. The system of claim 1, wherein the vision transformer comprises a fine-grained architecture including a search algorithm configured to perform latency-driven slimming that jointly improves model size and speed.

3. The system of claim 1, wherein the vision transformer network has a 4-stage hierarchical design.

4. The system of claim 3, wherein the vision transformer is configured to obtain feature sizes in ¼, ⅛, 1/16 and 1/32 of input resolution of the image.

5. The system of claim 1, wherein the global MHSA blocks are represented by:

$$\mathbb{X}_{i+1,j}^{B,C_j,\frac{H}{2^{j+1}},\frac{W}{2^{j+1}}} = S_{i,j} \cdot MHSA(Proj(\mathbb{X}_{i,j})) + \mathbb{X}_{i,j}$$

where Queries (Q), Keys (K), and Values (V) are projected from input features through linear layers Q, K,V←Proj($X_{i,j}$), and $$MHSA(Q, K, V) = Softmax(Q \cdot K^T + ab) \cdot V.$$

6. A method of using a vision transformer, comprising:
embedding an image using a convolution stem, wherein the convolutional stem is represented by:

$$\mathbb{X}_{i|_{i=1},j|_{j=1}}^{B,C_j|_{j=1},\frac{H}{4},\frac{W}{4}} = stem(\mathbb{X}_0^{B,3,H,W})$$

where B denotes a batch size, C refers to a channel dimension, H and W are a height and a width of a feature, $\underline{\mathbb{X}}_j$ is a feature in stage j, j∈ {1, 2, 3, 4} and i indicates the i-th layer;
capturing local information using a unified feed forward network (FNN), wherein the unified ENN is represented by:

$$\mathbb{X}_{i+1,j}^{B,C_j,\frac{H}{2^{j+1}},\frac{W}{2^{j+1}}} = S_{i,j} \cdot FFN^{C_j,E_{i,j}}(\mathbb{X}_{i,j}) + \mathbb{X}_{i,j}$$

where $S_{i,j}$ is a learnable layer scale and the unified ENN is constructed by a stage width $C_j$ and a per block expansion ratio $E_{i,j}$;
modeling spatial dependencies of the image using global multi head self attention (MHSA) blocks; and
performing position encoding using a learnable attention bias.

7. The method of claim 6, wherein the vision transformer comprises a fine-grained architecture including a search algorithm performing latency-driven slimming that jointly improves model size and speed.

8. The method of claim 6, wherein the vision transformer has a 4-stage hierarchical design.

9. The method of claim 8, wherein the vision transformer obtains feature sizes in ¼, ⅛, 1/16 and 1/32 of input resolution of the image.

10. The method of claim 6, wherein the global MHSA blocks are represented by:

$$\mathbb{X}_{i+1,j}^{B,C_j,\frac{H}{2^{j+1}},\frac{W}{2^{j+1}}} = S_{i,j} \cdot MHSA(Proj(\mathbb{X}_{i,j})) + \mathbb{X}_{i,j}$$

where Queries (Q), Keys (K), and Values (V) are projected from input features through linear layers Q, K, V←Proj($\mathbb{X}_{i,j}$), and $$MHSA(Q, K, V) = Softmax(Q \cdot K^T + ab) \cdot V.$$

11. A non-transitory computer readable medium storing program code, which when executed, is operative to cause a vision transformer to perform the steps of:
embedding an image using a convolution stem, wherein the convolutional stem is represented by:

$$\mathbb{X}_{i|_{i=1},j|_{j=1}}^{B,C_j|_{j=1},\frac{H}{4},\frac{W}{4}} = stem(\mathbb{X}_0^{B,3,H,W})$$

where B denotes a batch size, C refers to a channel dimension, H and W are a height and a width of a feature, $\underline{\mathbb{X}}_j$ is a feature in stage j, j∈ {1, 2, 3, 4}, and i indicates the i-th layer;
capturing local information using a unified feed forward network (FNN), wherein the unified ENN is represented by:

$$\mathbb{X}_{i+1,j}^{B,C_j,\frac{H}{2^{j+1}},\frac{W}{2^{j+1}}} = S_{i,j} \cdot FFN^{C_j,E_{i,j}}(\mathbb{X}_{i,j}) + \mathbb{X}_{i,j}$$

where $S_{i,j}$ is a learnable layer scale and the unified FNN is constructed by a stage width $C_j$ and a per-block expansion ratio $E_{i,j}$;
modelling spatial dependencies of the image using global multi head self attention (MHSA) blocks; and
performing position encoding using a learnable attention bias, wherein the vision transformer optimizes speed and size.

12. The non-transitory computer readable medium of claim 11, wherein the vision transformer comprises a fine-grained architecture including a search algorithm performing latency-driven slimming that jointly improves model size and speed.

13. The non-transitory computer readable medium of claim 11, wherein the vision transformer has a 4-stage hierarchical design.

14. The non-transitory computer readable medium of claim 13, wherein the vision transformer obtains feature sizes in ¼, ⅛, 1/16 and 1/32 of input resolution of the image.

* * * * *